United States Patent
Chan et al.

(10) Patent No.: US 11,082,871 B1
(45) Date of Patent: Aug. 3, 2021

(54) BLUETOOTH LOW-ENERGY SENSOR DATA COLLECTION DEVICE

(71) Applicant: ITERIS, INC., Santa Ana, CA (US)

(72) Inventors: Peter Chan, St. Charles, IL (US); Hong Chou, Naperville, IL (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 17/182,171

(22) Filed: Feb. 22, 2021

(51) Int. Cl.
*H04W 48/16* (2009.01)
*H04W 24/08* (2009.01)
*H04B 17/318* (2015.01)

(52) U.S. Cl.
CPC .......... *H04W 24/08* (2013.01); *H04B 17/318* (2015.01)

(58) Field of Classification Search
CPC ............................. H04W 24/08; H04B 17/318
See application file for complete search history.

(56) References Cited

U.S. PATENT DOCUMENTS

| | | | |
|---|---|---|---|
| 8,510,025 B2 | 8/2013 | Chan | |
| 9,154,982 B2 | 10/2015 | Chan | |
| 2012/0307676 A1* | 12/2012 | Chan | H04W 24/08 370/252 |
| 2015/0382217 A1* | 12/2015 | Odio Vivi | H04B 17/336 370/252 |
| 2017/0059687 A1* | 3/2017 | Dinesh | G01S 5/02 |
| 2017/0110008 A1* | 4/2017 | Benhammou | G08G 1/0141 |
| 2019/0327616 A1* | 10/2019 | Ganu | H04W 12/08 |

* cited by examiner

*Primary Examiner* — Walli Z Butt
(74) *Attorney, Agent, or Firm* — Lazaris IP

(57) ABSTRACT

Systems, methods, and computer-executable instructions for collecting traffic data from devices. A data collection node determines a scanning algorithm. Multiple channels of a spectrum are scanning simultaneously. An advertising packet is detected on a channel. A MAC address is extracted from the advertising packet and at least one byte is removed from the MAC address. An identifier is created based on the reduced MAC address. A message including the identifier, RSSI of the advertising packet and timestamp is sent to a remote server. The remote server uses the received data from multiple data collection units to create traffic data associated with devices.

20 Claims, 18 Drawing Sheets

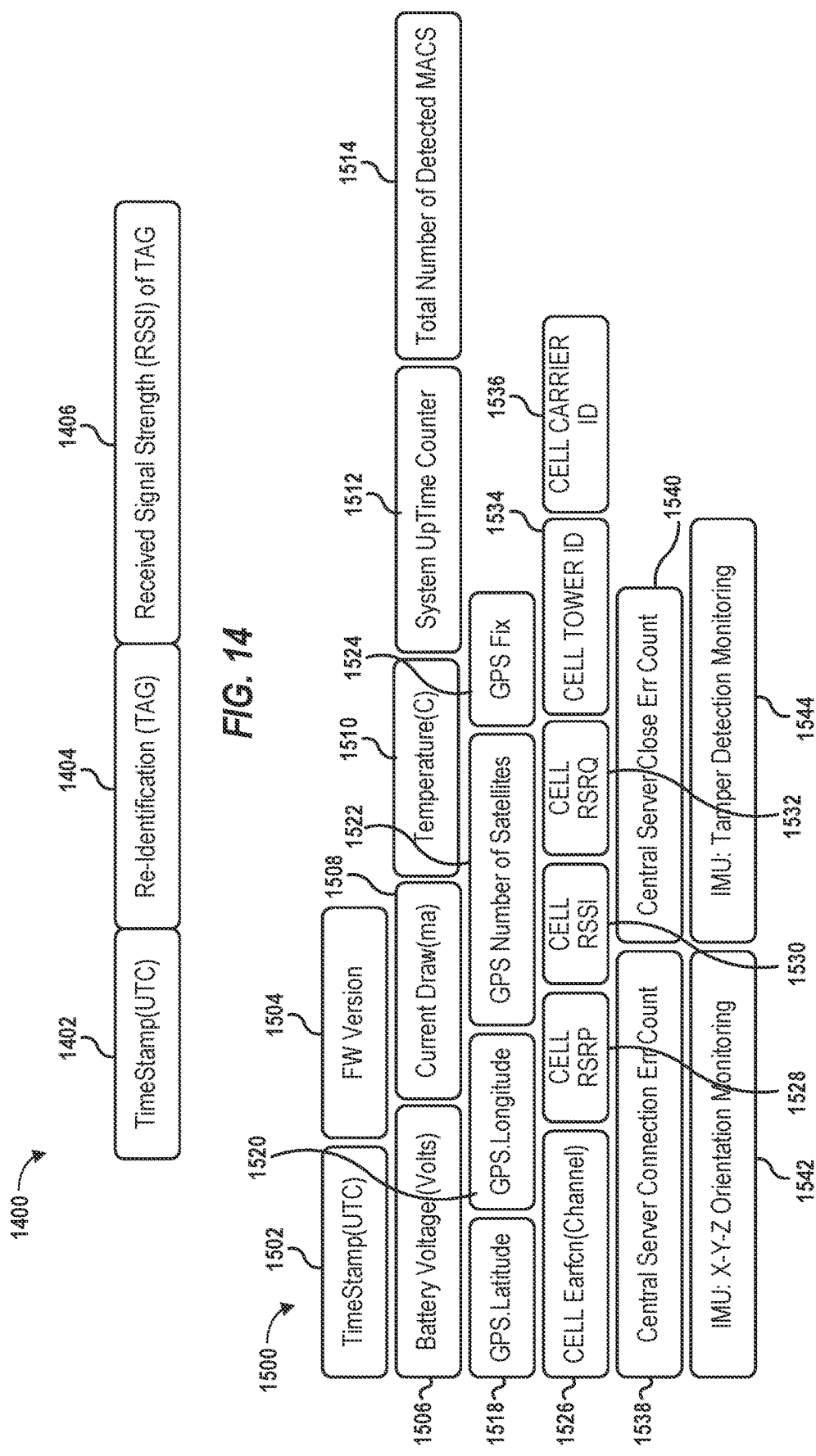

US 11,082,871 B1

BLUETOOTH LOW-ENERGY SENSOR DATA COLLECTION DEVICE

FIELD OF THE INVENTION

The field of the disclosure relates generally to traffic management systems. More specifically, the disclosure relates to a traffic and pedestrian management system that collects information transmitted from devices related to vehicles and pedestrians.

BACKGROUND OF THE INVENTION

Currently, various information service providers (ISPs) provide traffic information to users. With the improvement in the quality and the granularity of traffic and travel time information, ISPs attempt to provide route-specific travel time information and dynamic route guidance information to individual users to influence the individual's travel choices including departure time, arrival time, route, destination, etc. An individual traveler relies on the ISP's information and personal experiences and preferences to make individual decisions for their travel choices.

As ISPs provide route-specific travel time information and dynamic route guidance information to more and more individual users, market penetration of actionable traffic information services may increase rapidly. As this type of actionable traffic information provision market penetration reaches a critical threshold, users with similar traffic and travel time information may compete for the shortest travel time routes creating new congestion for these routes. For example, users in the San Francisco Bay Area typically choose US 101 to travel from San Francisco to San Jose. When severe congestion occurs on US 101, for example, due to a major traffic accident, many ISPs advise motorists to use alternate routes I-280 or El Camino Real to avoid major congestion on US 101. However, with the diversion of a large number of users from US 101 to I-280 or El Camino Real these routes quickly become congested.

In order to populate these systems, large amounts of traffic data need to be collected. In addition, the more traffic information gathered results in improved traffic guidance. Accordingly, improved systems and methods for collecting traffic data from vehicles or pedestrians are needed.

BRIEF SUMMARY OF THE INVENTION

A data collection unit may be used to collect data, such as traffic data, from broadcasting devices when those broadcasting devices are within receiver range of the data collection unit. A group of data collection units may be used together to collect data from devices within a coverage area. Collected traffic data may be used to determine current traffic levels, trip times, and speeds of devices. This information can then be used to provide traffic information of the coverage area. For example, trip times between two points in the coverage area may be calculated using the collected traffic data. The collected traffic data may be anonymized such that the device is generally uniquely identifiable within the collected data, but cannot be used to identify the actual device or the owner of the device.

In various examples, the data collection units may be installed near roads, walk ways, or any areas where devices travel. For example, anywhere people with devices move can be covered by the reception area of one or more data collection units. The data collected from these data collection units may then be used to analyze traffic information or pedestrian information. In some examples, the data collection unit may be used outdoors, indoors, or combination of both. In some examples, the data collection units use advertising packets from devices broadcasting Bluetooth Low Energy ("BLE") packets. Scanning spectrum for BLE packets may involve using a 802.15.4 protocol scanning technique. This and other described techniques may be compliant with existing BLE advertisers and beacons. Accordingly, the described data collection units may receive BLE packets from mobile devices already available.

As multiple data collection units may work together and be spread out over a large area, powering these devices becomes a logistical challenge. In various embodiments, a solar panel may be used to charge a battery of a data collection unit. Different scanning techniques may also be used to change the power consumption of a data collection unit.

A data collection unit may send its data to a remote server. The remote server may collect data from multiple data collection units and analyze the data in aggregate. In various examples, a data collection unit may use a low energy narrow band Internet of Things (IoT) transmission to send collected data to the remote server. For example, wireless carrier technology such as long-term evolution (LTE)—CAT M1, narrow band IOT (NB-IOT), global system for mobile communication (GSM) with global navigation system (GNSS) location-based technology may be used to send a low overhead Hypertext Transfer Protocol (HTTP)/Message Queuing Telemetry Transport (MQTT) data transmission to send collected data to the remote server.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

FIG. 14 illustrates a re-identification packet structure for a data collection unit in accordance with respective examples;

FIG. 15 illustrates a heartbeat packet structure for a data collection unit in accordance with respective examples;

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention. For purposes of explanation, numerous specific details are set forth to provide a thorough understanding of representative embodiments of the invention. It will be evident, however, to one skilled in the art that the invention may be practiced without these specific details. The drawings are not to scale. In other instances, well-known structures and devices are shown in simplified form to facilitate description of the exemplary embodiments.

Figure 1A:
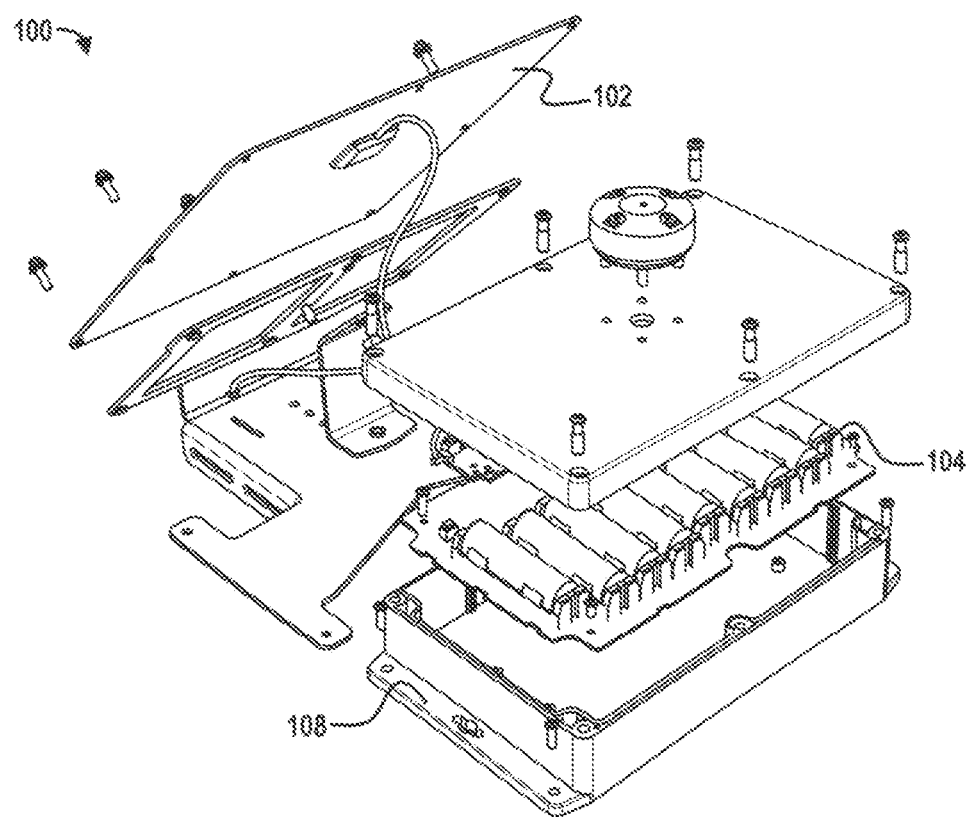
FIG. 1A is an exploded view of a data collection unit in accordance with respective examples.
Figure 1B:
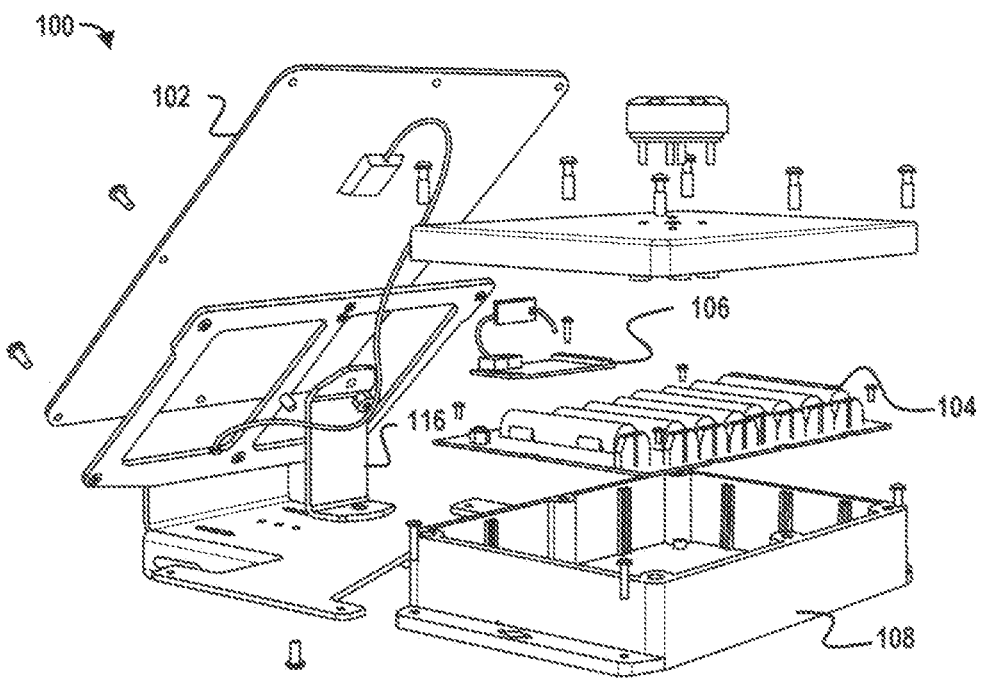
FIG. 1B is an exploded view of a data collection unit in accordance with respective examples.

FIG. 1A and FIG. 1B are exploded views of a data collection unit 100 in accordance with respective examples. The data collection unit is powered by one or more batteries 104. The batteries are charged by a solar panel 102 in the shown example. The solar panel 102 is attached to a housing 108 that houses the batteries 104 and a circuit board 106. The circuit board 106 may include a processor and memory used to operate the data collection unit as described herein. The processor and memory may be used to implement the subsystems described herein. In other examples, the data collection unit is provided power directly from a power source connected to an electrical grid. In these examples, the data collection unit may or may not include a solar panel 102.

Figure 2:
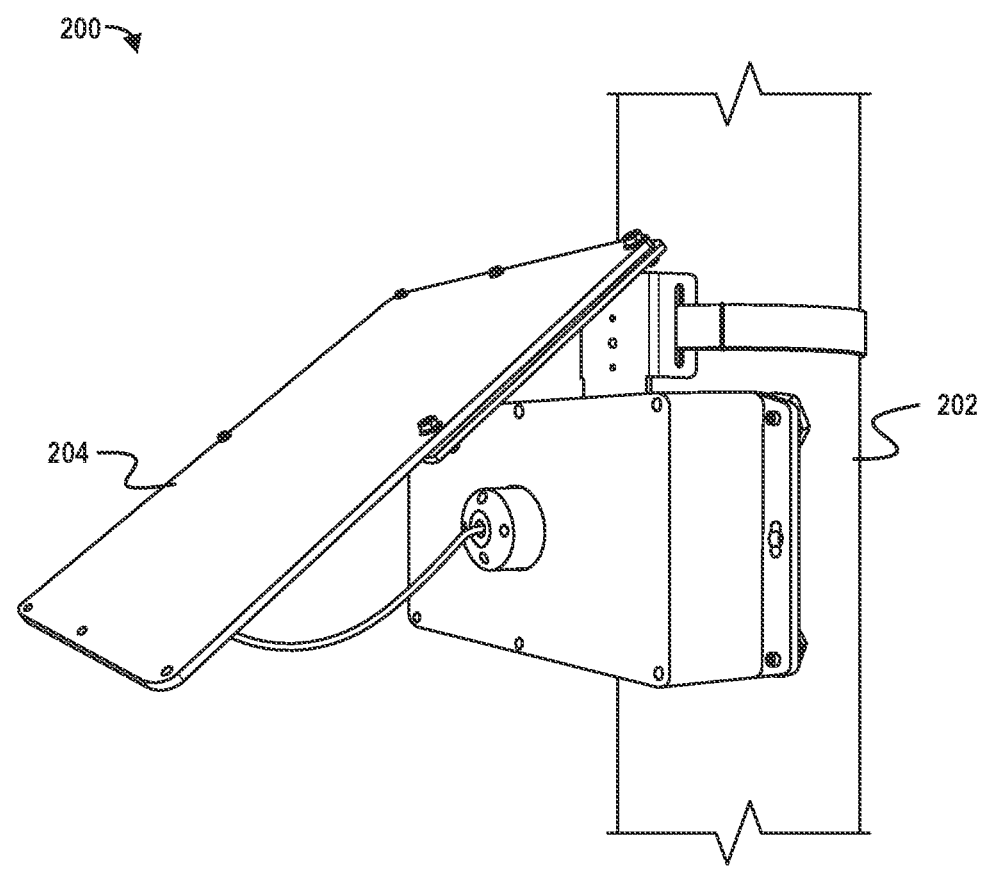
FIG. 2 illustrates a data collection unit in accordance with respective examples.

FIG. 2 illustrates a data collection unit 200 in accordance with respective examples. The shown data collection unit 200 is attached to a support 202, such as a pole. In some examples, the support 202 may be a lamp post alongside a road or walkway. The data unit 200 includes a solar panel 204 that is used to power the data collection unit 200.

Figure 3A:
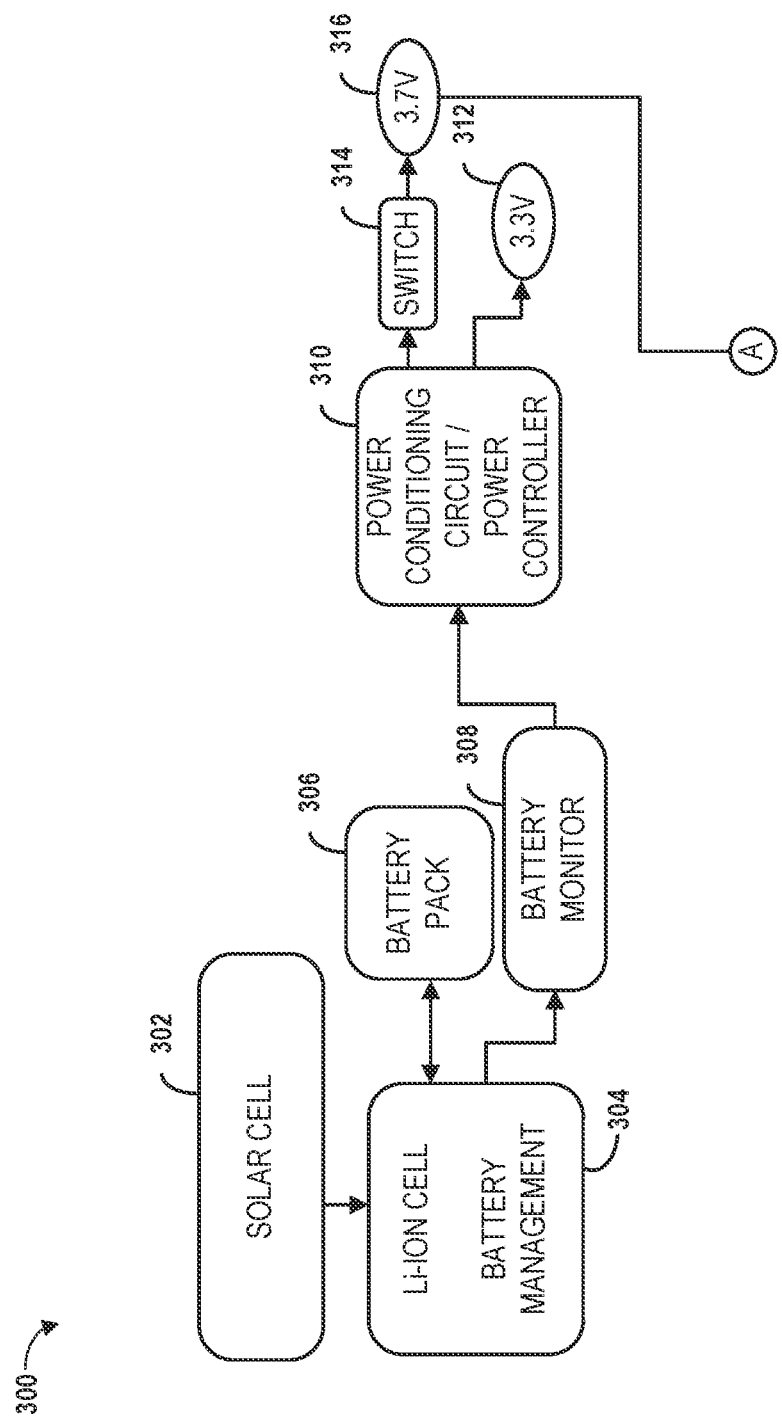
FIGS. 3A-3C illustrates an electrical system of a data collection unit in accordance with respective examples.
Figure 3B:
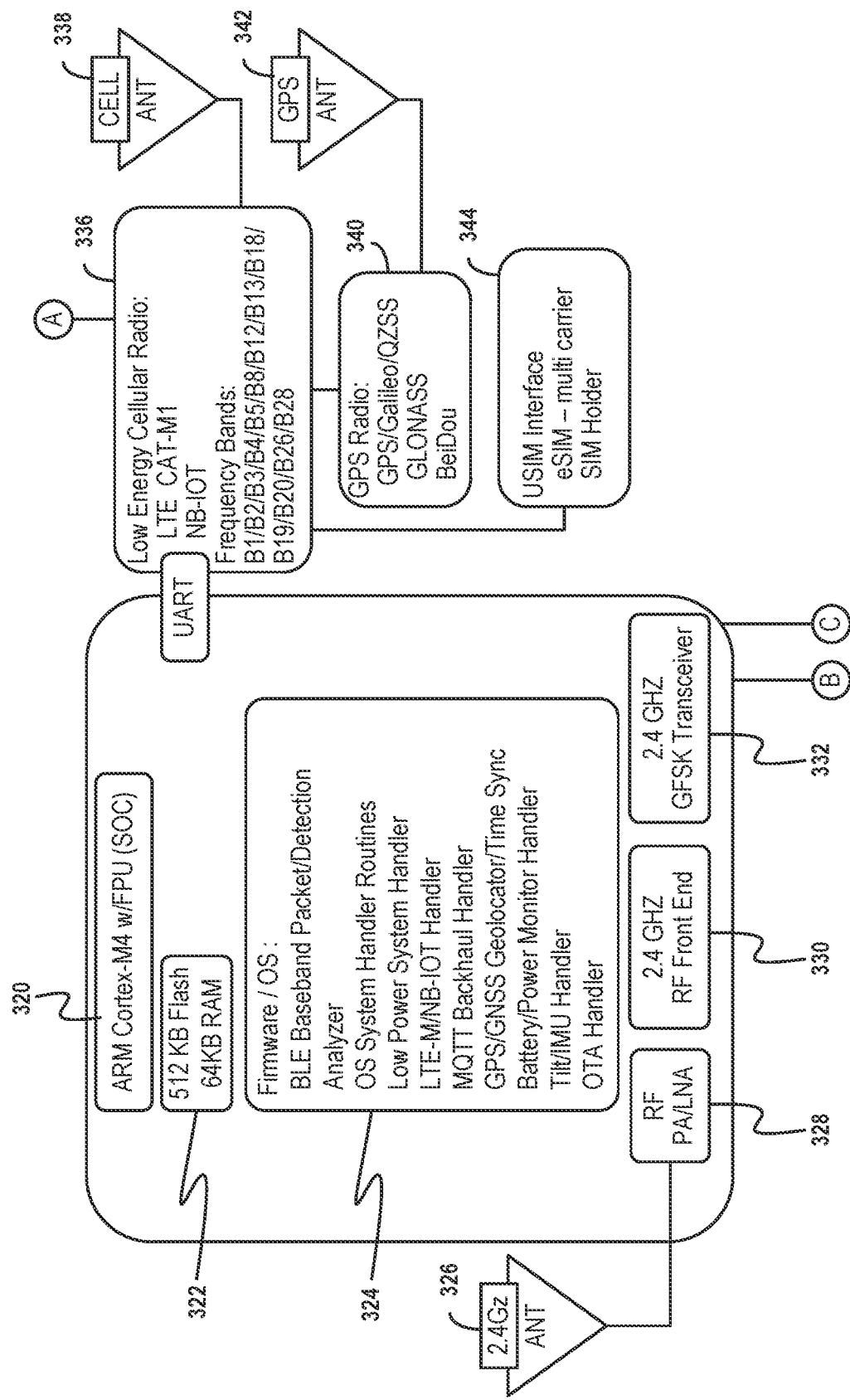
Figure 3C:
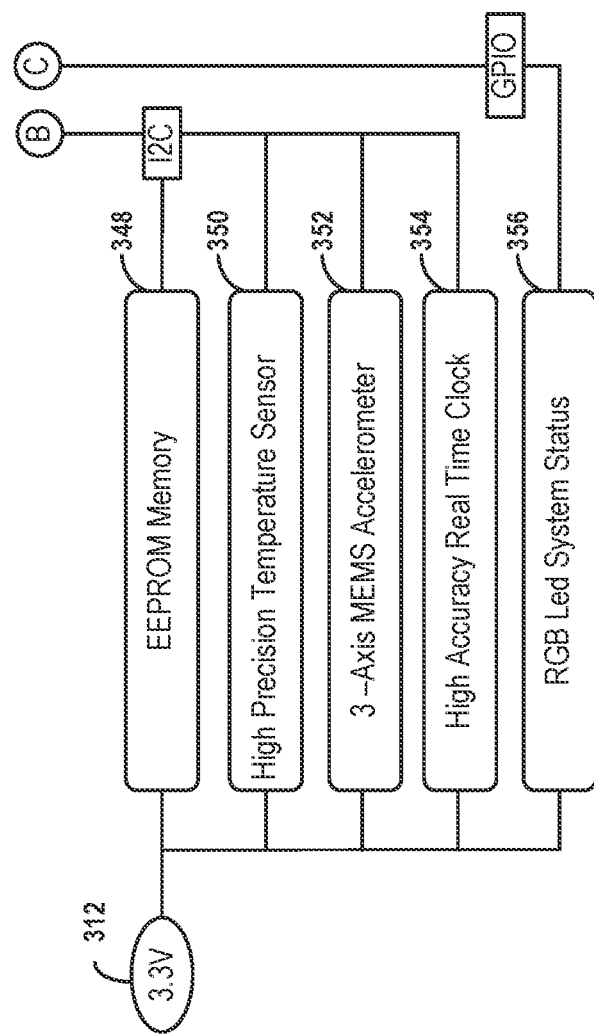

FIGS. 3A-3C illustrates an electrical system 300 of a data collection unit in accordance with respective examples. The electrical system 300 includes a solar cell 302 used to charge a battery 304, such as a Li-ION battery. A solar charger battery management system, not shown, may use the battery to charge a battery pack 306. The battery pack may be a 3.7 volt array battery pack. The solar cell 302 may be a monocrystalline high efficiency 6 volt, 5 to 10 watt solar cell. A battery monitor/low voltage cutoff 308 may be used cut off power to the remaining circuitry of the data collection unit. The low voltage cutoff 308 may be used to ensure proper charging of the battery when the battery does not have enough power to adequately supply subsystems of the data collection unit. A power conditioning circuit 310 may be used to provide different voltage outputs. For example, the power conditioning circuit 310 may provide a 3.3 voltage source 312 and a 3.7 voltage source 314. The voltage sources are used to power the subsystems of a data collection unit. Switches, such as switch 314, may be to remove power from one or more subsystems. For example, power may be removed as part of a power saving mechanism.

A data collection unit may include various subsystems such as memory 348; temperature 350; accelerometer 352; real-time clock 354; and system status 358 subsystems. In some examples, one or more of these subsystems may be powered by voltage provided by the power conditioning circuit 310. For example, the subsystems may be powered by a 3.3 voltage 312 source.

A data collection unit also includes a processor 320; one or more antennas 326 for receiving data from devices; and one or more antennas 338 and 342 for sending collected data to a remote server. The data collection unit includes memory 322, such as a combination of flash memory and RAM. Firmware 324 on the data collection unit may include the software used to control the operation of the data collection unit. As explained in greater detail below, the firmware may include a BLE packet analyzer; an operating system handler; low power system handler; cellar system handler; data transfer handler; time sync handler; battery power handler; tilt handler; and an over-the-air handler.

The BLE packet analyzer may use one or more of an amplifier 328; a 2.4 Ghz front end 330; and a 2.4 Gaussian frequency shift keying (GFSK) transceiver 332. Using these components, the BLE packet analyzer may scan the BLE spectrum looking for BLE advertisements from devices. The data collection unit may use different scanning algorithms based on power consumption and current available power. These different scanning algorithms are described in greater detail below.

Once the data collection unit collects data, the collected data is sent to a remote server. The remote server receives collected data from multiple data collection units. Combining data from multiple data collection units allows the remote server to determined traffic information. Traffic information includes, but is not limited to, speed, traveled route, and congestion levels. This traffic information may then be used to support traffic services, such as providing directions taking into account the traffic information. The data collection unit may send the collected data via a cellular radio 336. The cellular radio 336 may be a low energy cellular radio that takes advantage of narrow band Internet-of-Things or other low power method that uses an antenna 338 to transmit the collected data. As needed, the data collection unit may include a SIM holder 344 that stores device information used to access the cellular network. In some examples, the data collection unit includes a GPS radio or other positioning device 340 that uses an antenna 342. The GPS radio 340 may be used to provide the remote server with the data collection unit's location. The remote server may then use this information to determine the location of a device identified in the collected data.

In one example, the data collection unit receives 802.15 protocol BLE packets. Low energy narrow band IOT cellular technology such as wireless carrier technology LTE—CAT M1, NB-IOT, GSM with GNSS GPS location-based technology combined with a low overhead MQTT backhaul solution and low overhead HTTP backhaul transmission may be used for sending packet data over the air to a central processing unit. In addition, the data collection unit may use a low energy system on an embedded chip, e.g., SOC ARM cortex-M4, microcontroller and firmware to implement the features of the data collection unit.

Figure 4:
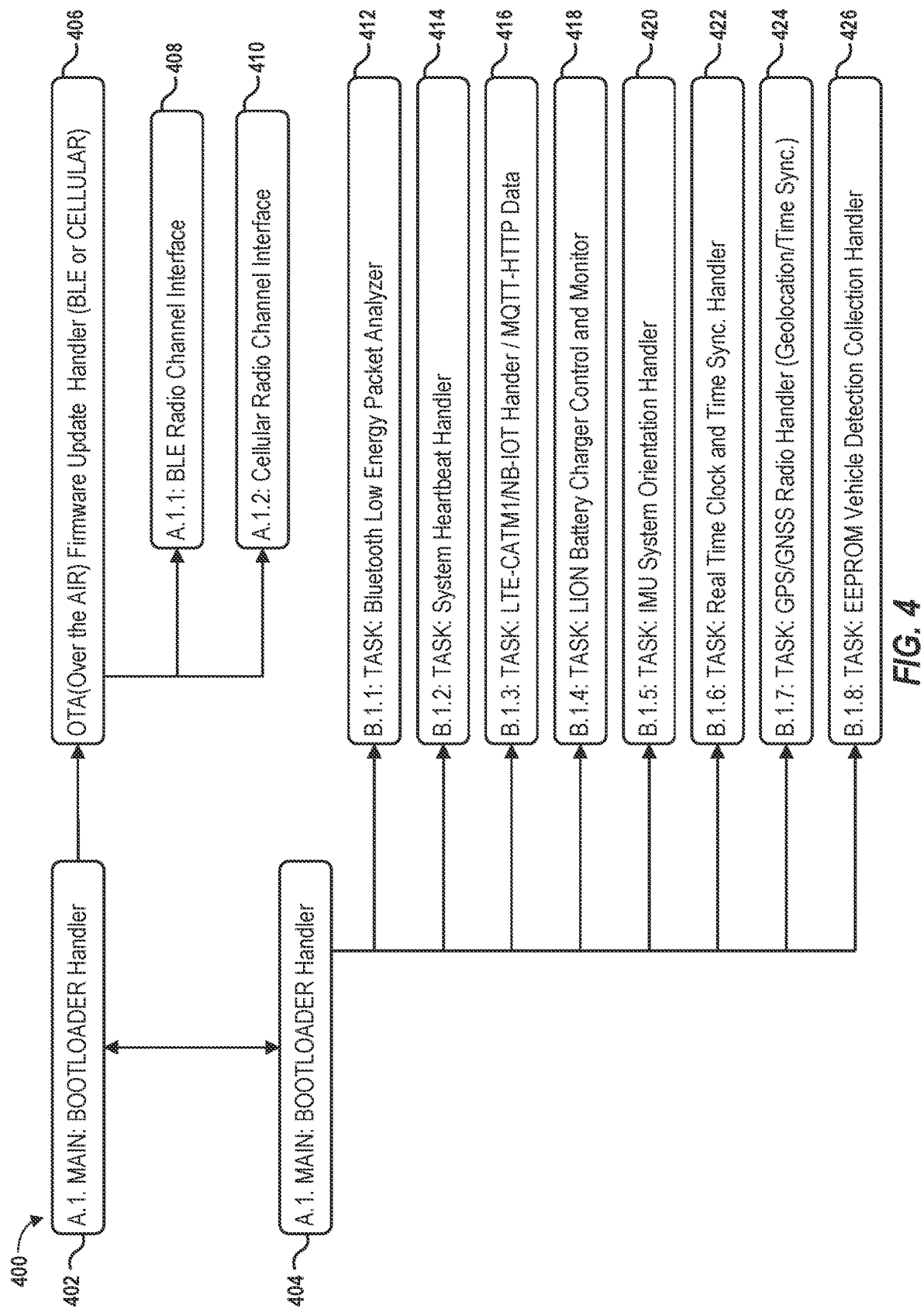
FIG. 4 illustrates a processing flowchart for a data collection unit in accordance with respective examples.
Figure 5:
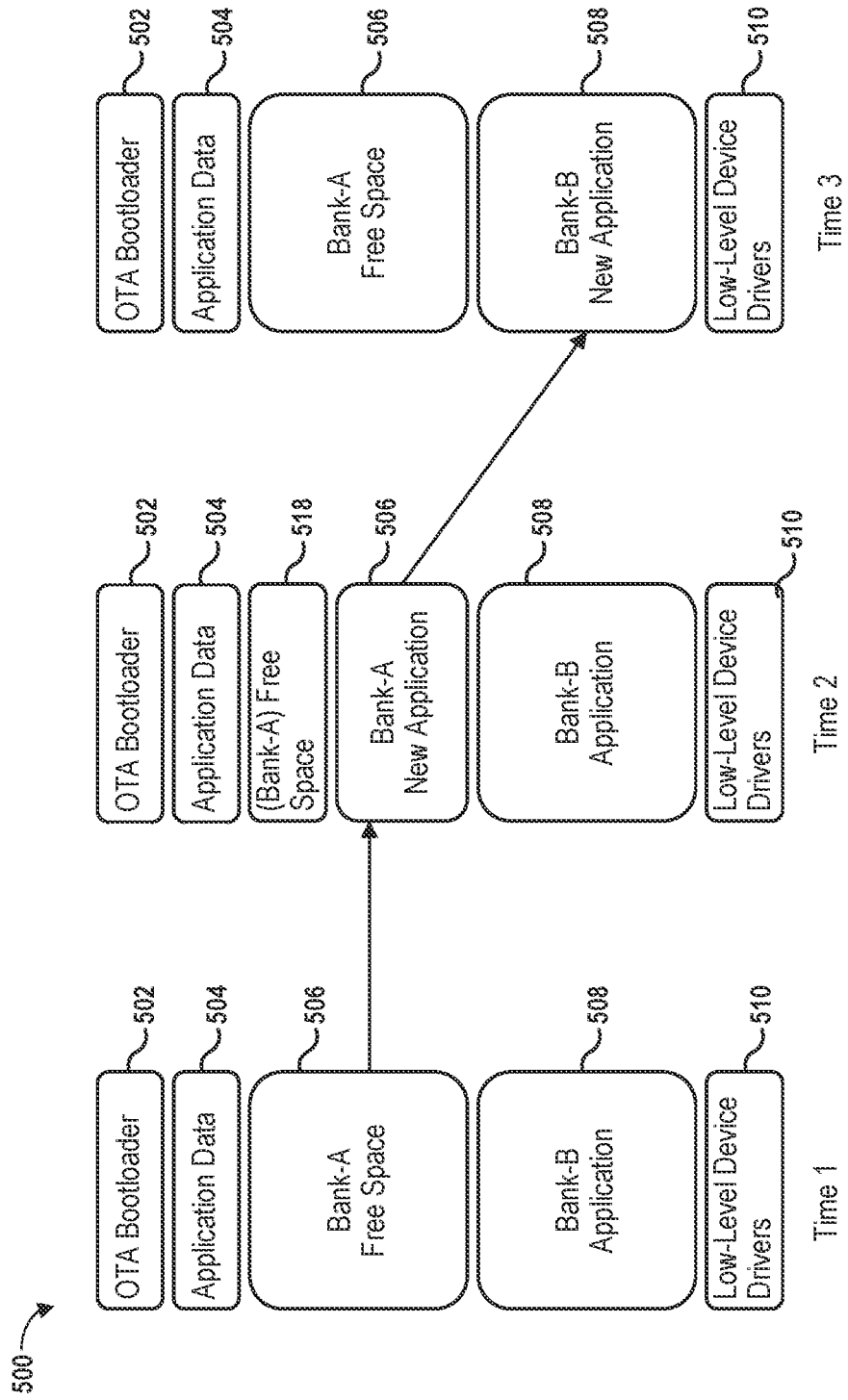
FIG. 5 illustrates a bootloader process for a data collection unit in accordance with respective examples.

FIG. 4 illustrates a processing flowchart for a data collection unit in accordance with respective examples. When the data collection unit boots up, either an update handler 402 or a normal mode handler 404 will execute. The update handler 402 executes a firmware update handler 406 that may receive updated software from a device using BLE, via a BLE interface 408, or from a remote system using cellular, via a cellular interface 410. The cellular interface 410 is responsible for handling configuration setting and firmware upgrading over a cellular network channel. The BLE interface 408 is responsible for handling configuration setting and firmware upgrading over a BLE channel. The update handler 402 may be used to update the configuration of a data collection unit without needing to update the firmware. FIG. 5 provides additional details regarding how the firmware update is accomplished.

The normal mode handler 404 works to collect data from sensed devices. Accordingly, the normal mode handler 404 ensures that the needed subsystems are initiated. For example, the normal mode handler 404 may initiate a BLE packet analyzer 412; a heartbeat handler 414; collected data transmission handler 416; battery charger handler 418; system orientation handler 420; clock handler 422; location handler 424; and a device detection collection handler 426. The device data collection handler 426 may also be referred to as a re-identification data handler. These handlers are described in greater detail below.

In an example, the BLE packet analyzer uses a 2.4 Ghz radio front-end RF receiver with Gaussian Frequency Shift Key modulation to digital baseband conversion for digital analysis of received data. The heartbeat handler 414 is responsible for collecting all system health metrics. The collected data transmission handler 416 is responsible for backhaul communications for packetizing local collected sensor data and transmitting the data over a cellular link to the remote server. The battery charger handler 418 may monitor the battery status and low power system handler. In addition, the battery charger handler 418 may include or use an inertial measurement unit (IMU) to orient the solar panel for optimal solar power charging conditions. The system orientation handler 420 is responsible for collecting system orientation for proper mounting configuration and tamper detection. The clock handler 422 may record UTC time stamps used for heartbeat and re-identification packets. The location handler 424 may collect collecting UTC time stamps and geolocation data via a location service, such as a GPS/GNSS satellite system. The device detection handler 426 may store re-identification packets into non-volatile memory for logging purposes.

FIG. 5 illustrates a bootloader process 500 for a data collection unit in accordance with respective examples. The bootloader process 500 allows the reprogramming of firmware or configuring settings to the data collection unit. At time 1, before an update has started, the data collection unit contains an over-the-air bootloader 502; application data 504; free memory space 506; an original application 508; and device drivers 510. The original application 508 may be the active running firmware application image of the data collection unit.

When the data collection unit boots into an update mode, the over-the-air bootloader 502 initiates the updating procedure. A new application is downloaded and stored in free space 506 as shown at time 2 in memory block 520. The new application may be received via a BLE radio transfer or via a cellular transfer. Once the download is complete, at time 2, an application verification and a CRC verification may be done to ensure that the application was downloaded and stored property. If the contents in Bank-A 520 passes both validation and CRC verification, the new firmware application image is transferred to Bank-B 532, effectively overwriting the original application. Once the new application has been successfully transferred to Bank-B 532, the data in Bank-A can be deleted or marked as free. The data collection unit may transfer control to the new OTA firmware application image that resides in Bank-B 508. If Bank-A 506 fails either a validated application image or CRC verification then the original firmware application in Bank-B 508 remains and the bootloader transfers control to the original firmware application that resides in Bank-B 508. Regardless of the status of the download, the data collection unit may reboot and the main process handler begins or a new OTA update begins.

The BLE packet analyzer 412 is responsible for scanning and analyzing, in free space, for the presence of BLE advertising packets from vehicular or pedestrian based traffic packets. In various examples, only the MAC address portion and RSSI detected by the data collection unit of these BLE advertising packets are stored and time stamped. As described below, the MAC or portions of the MAC may be used as an unique re-identification data point associated with a vehicle or pedestrian.

Figure 6:
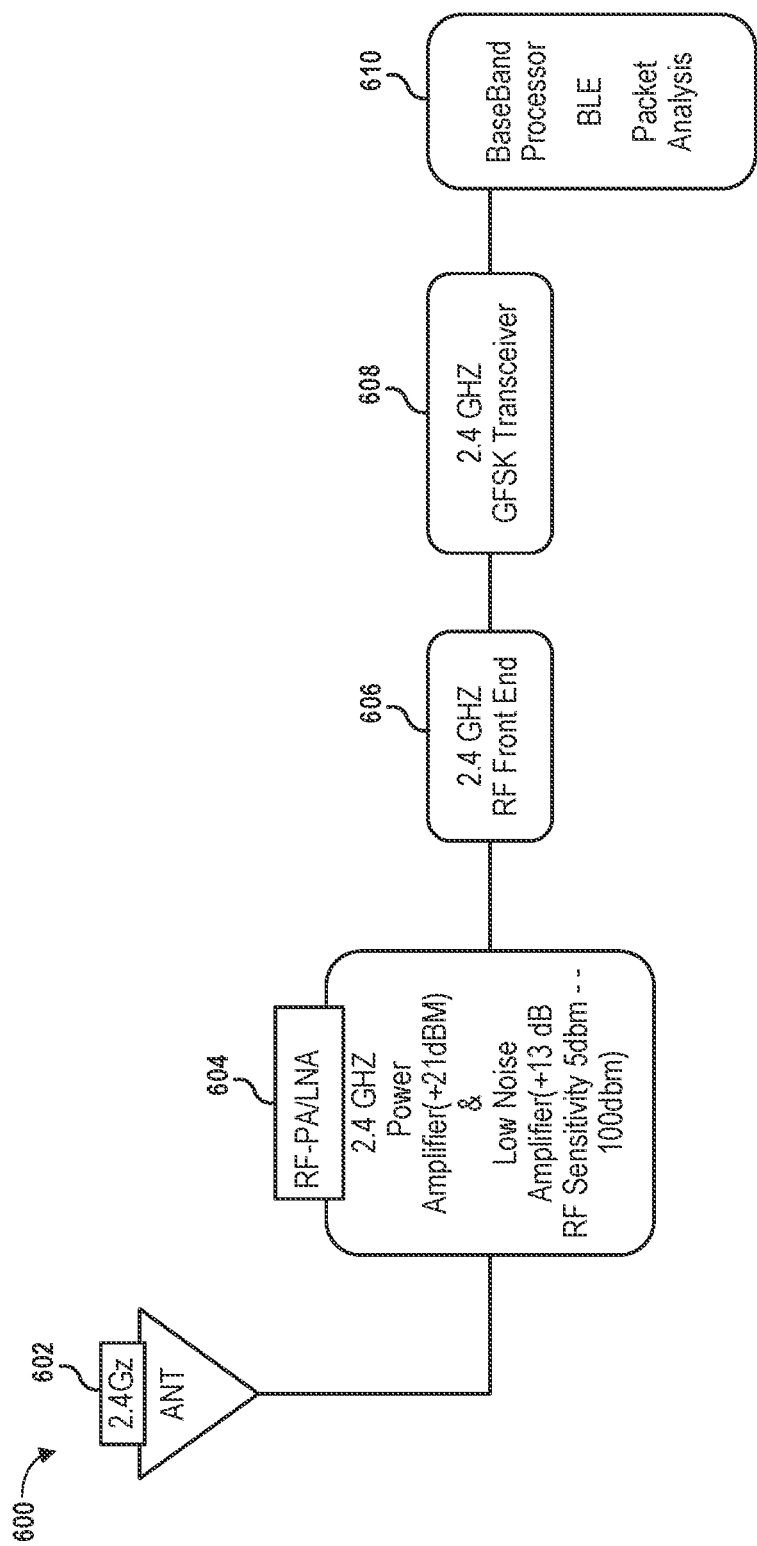
FIGS. 6-7 illustrate a radio frequency front end for a data collection unit in accordance with respective examples.
Figure 7:
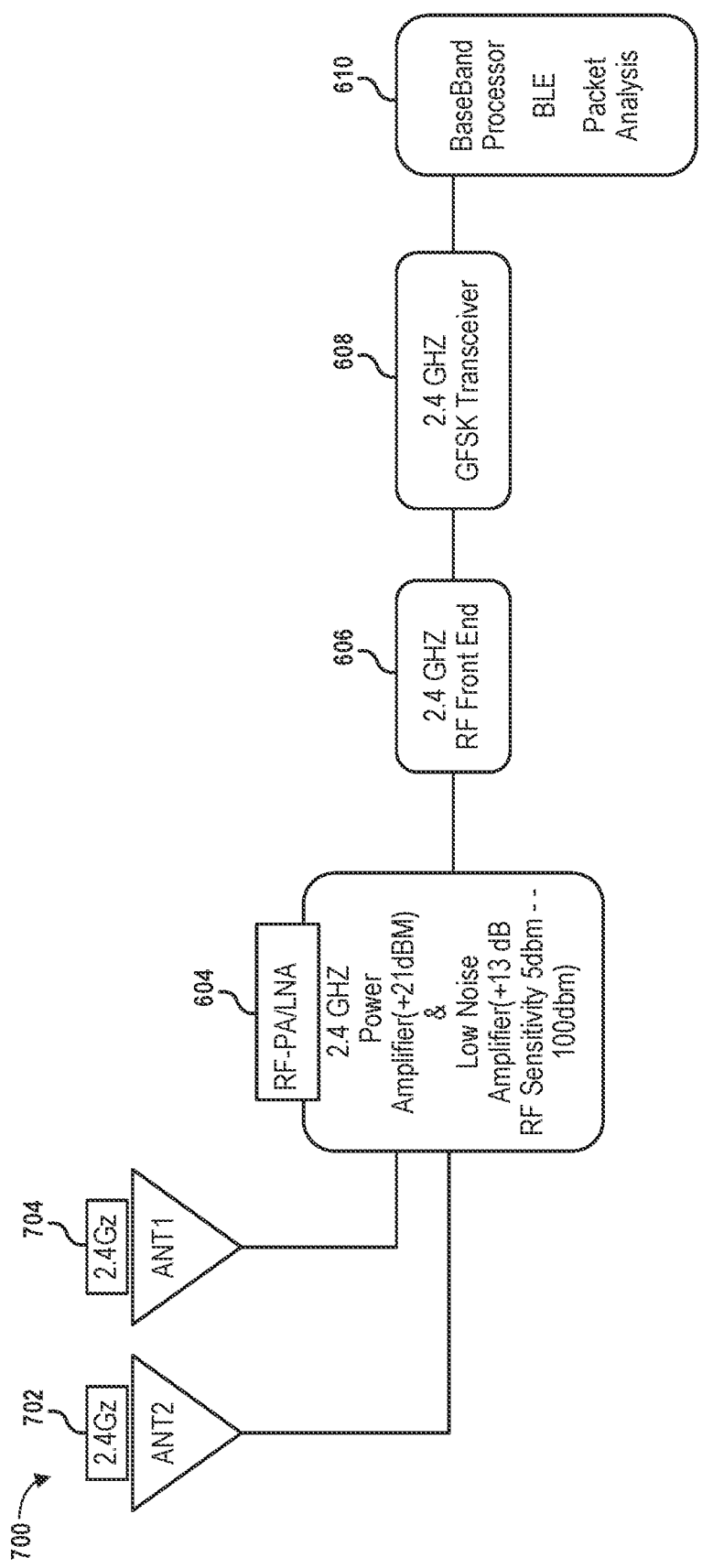

The BLE packet analyzer 412 may use various different hardware interfaces and configurations. In some examples, the data collection unit includes all of the hardware for any configuration. In other examples, the data collection unit includes hardware to support one or more configurations, but not every possible configuration. FIGS. 6-7 illustrate a radio frequency front end for a data collection unit in accordance with respective examples. FIG. 6 illustrates a single antenna BLE radio frequency front end. FIG. 7 illustrates a dual antenna BLE RF front end. Both front ends may use power amplifiers and low noise amplifiers 604; a 2.4 Ghz front end 606; a GFSK transceiver 608; and a processor for BLE packet analysis. The hardware difference between these two configurations is the use of one antenna 602 versus the use of two antennas 702 and 704. Using two antennas improves the RF performance. For example, the RF sensitivity is increased as is the distance at which the data collection unit can detect an advertising packet emitted from a mobile device located in a pedestrian or vehicular object. The RF-PA/LNA component 604 shown in both configurations may attenuate the RF receives energy which provides the capability of controlling the distance at which the data collection unit can detect a vehicle or pedestrian object.

The BLE packet analyzer scans spectrum associated with the BLE spectrum and attempts to decode information on one or more defined BLE channels. A BLE device may advertise broadcast type messages into free space continuously using three channel, e.g., channels: 37,38,39, out of forty possible channels. The BLE specification defines BLE channels to be 2 Mhz wide.

Figure 8:
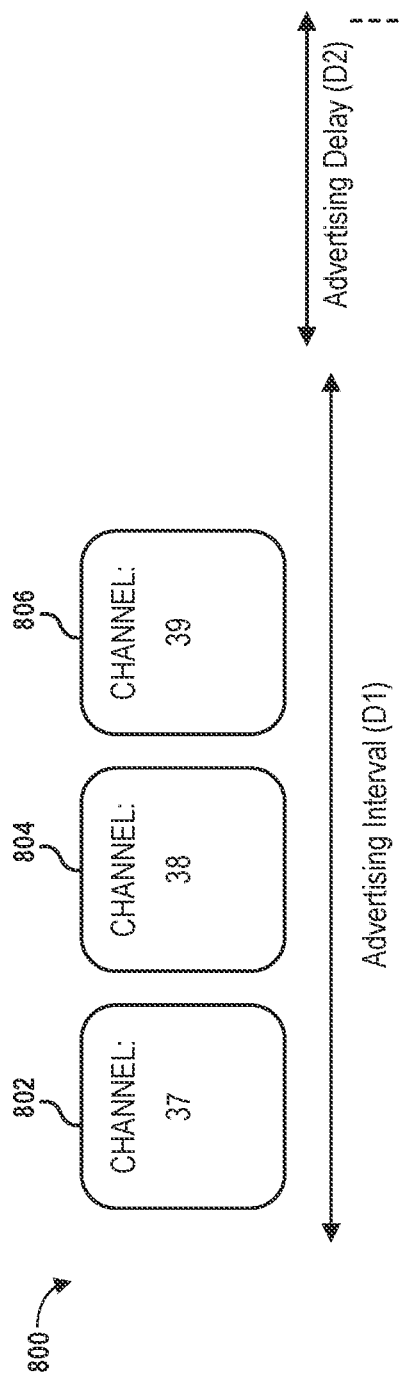
FIG. 8 illustrates a Bluetooth Low Energy advertising process.

The BLE advertising message interval of a mobile device, time interval an advertising message is broadcasting, varies between 20 milliseconds and 10.24 seconds (D1) and the advertising delay (D2), time between subsequent advertising intervals, randomly varies between 0 to 10 milliseconds. FIG. 8 illustrates a Bluetooth Low Energy advertising process 800. The advertising interval D1 illustrates the time that an advertising message may be broadcast on one of channel 37 802; 38 894; or 39 806. Multiple devices may simultaneously transmit advertising messages using different channels.

Figure 9:
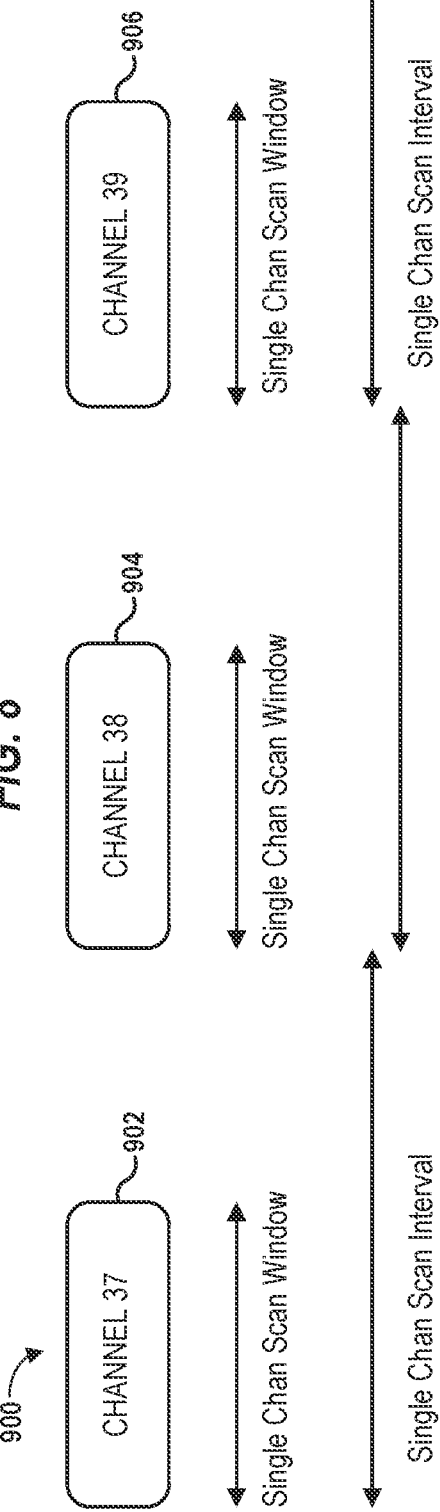
FIG. 9 illustrates a sequential scanning process for a data collection unit in accordance with respective examples.

The data collection unit may use one of two different scanning processes to detect advertising messages: serial or parallel. In some examples, configuration data is used to determine which process to use. In another example, available battery power is used to select which process to use. FIG. 9 illustrates a sequential scanning process 900 for a data collection unit in accordance with respective examples. This process scans each channel, 902, 904, and 906, one at time in series. For example, the channels may be scanned in a sequential order. The channels may be scanned in any order, such that each channel is scanned once, and then the channels are rescanned, possibly in a different order than previously. The sequential process has the advantage of requiring less power than the parallel process. The sequential process, however, has the disadvantage of missing advertisement packets that are broadcast on a channel that is not currently being scanned.

Figure 12:
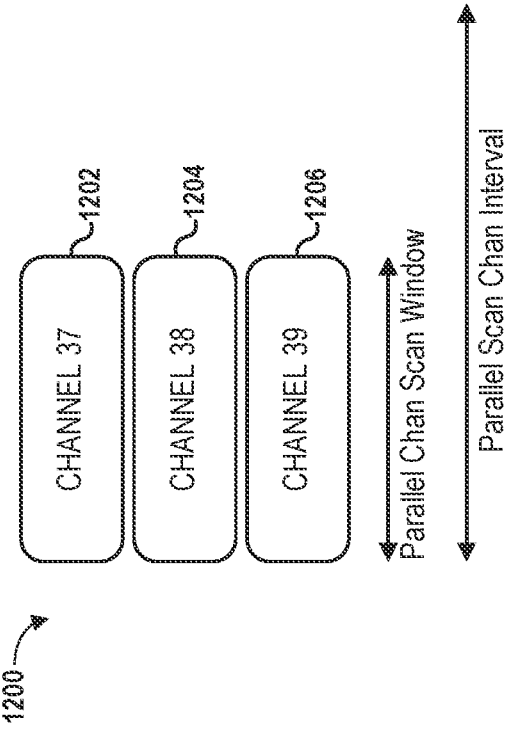
FIG. 12 illustrates a parallel scanning process for a data collection unit in accordance with respective examples.

FIG. 12 illustrates a parallel scanning process 1200 for a data collection unit in accordance with respective examples. The data collection unit scans all three channels 1202, 1204, and 1206 at the same time. Thus, the data collection unit demodulates all three channels simultaneously. This process 1200 ensures no advertising packets are missed. This advantage, however, requires more power than the sequential scan method. In a hybrid example, two channels are scanned at once. This approach reduces the chance of a missed advertising message while being lower power than scanning all three channels at once.

Figure 10:
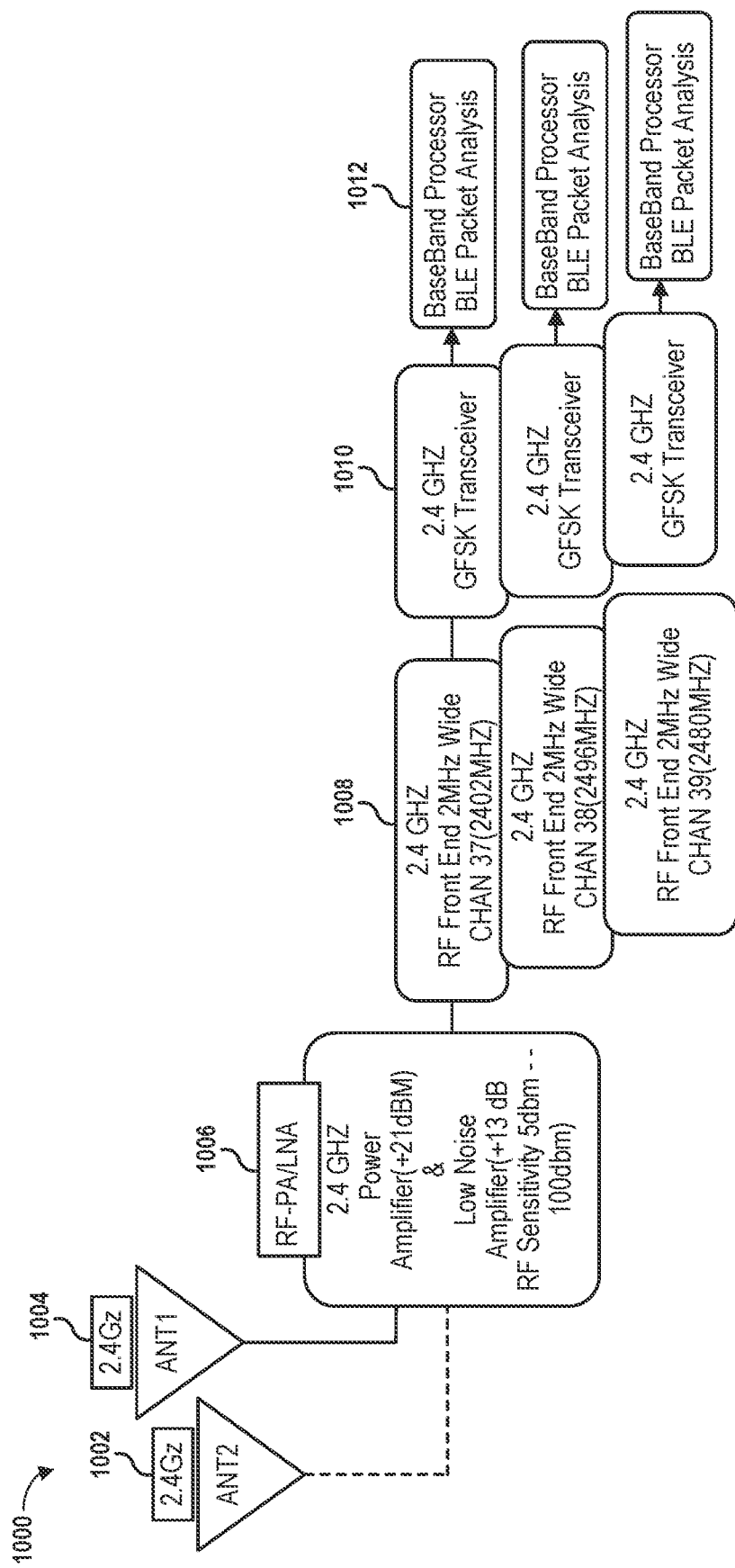
FIGS. 10-11 illustrate a radio frequency front end for a data collection unit in accordance with respective examples.
Figure 11:
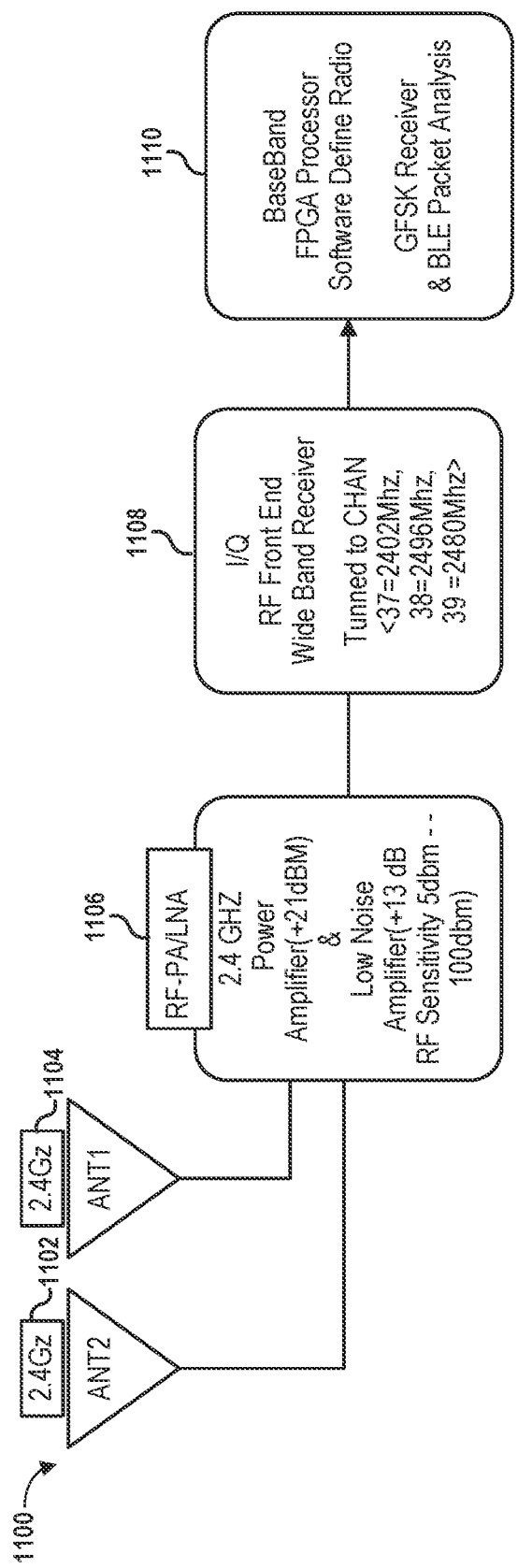

FIGS. 10-11 illustrate a radio frequency front end 1000 for parallel scanning for a data collection unit in accordance with respective examples. FIG. 10 illustrates three separate GFSK radio receivers. This configuration includes one or more antennas 1002 and 1004 and a power amplifier and low noise amplifier 1006. Accordingly, this configuration may use dual or single antenna diversity. In addition, there are three GFSK radio receivers, each with a front end 1008; and GFSK transceiver 1010, and a package analyzer 1012. The three GFSK radio receivers are used to scan different channels, e.g., 37, 38, and 39. In the hybrid configuration, there would only be two GFSK radio receivers.

FIG. 11 illustrates another configuration that uses a wide band I/Q RF front end 1108 that covers the three advertising channels. For example, the I/Q RF front end may cover 2 Mhz-wide advertising channels centered at 37=2402 Mhz, 38=2496 Mhz, 39=2480 Mhz. The received signal may then be sent to a software defined radio 1110 for GFSK demodulation and processing. The software defined radio 1110 may be implemented using a FPGA processor. Similar to the configuration shown in FIG. 10, this configuration may use one antenna 1102 or two antennas 1102 and 1104. A power amplifier and low noise amplifier 1106 may also be used to condition the signal.

Figure 13:
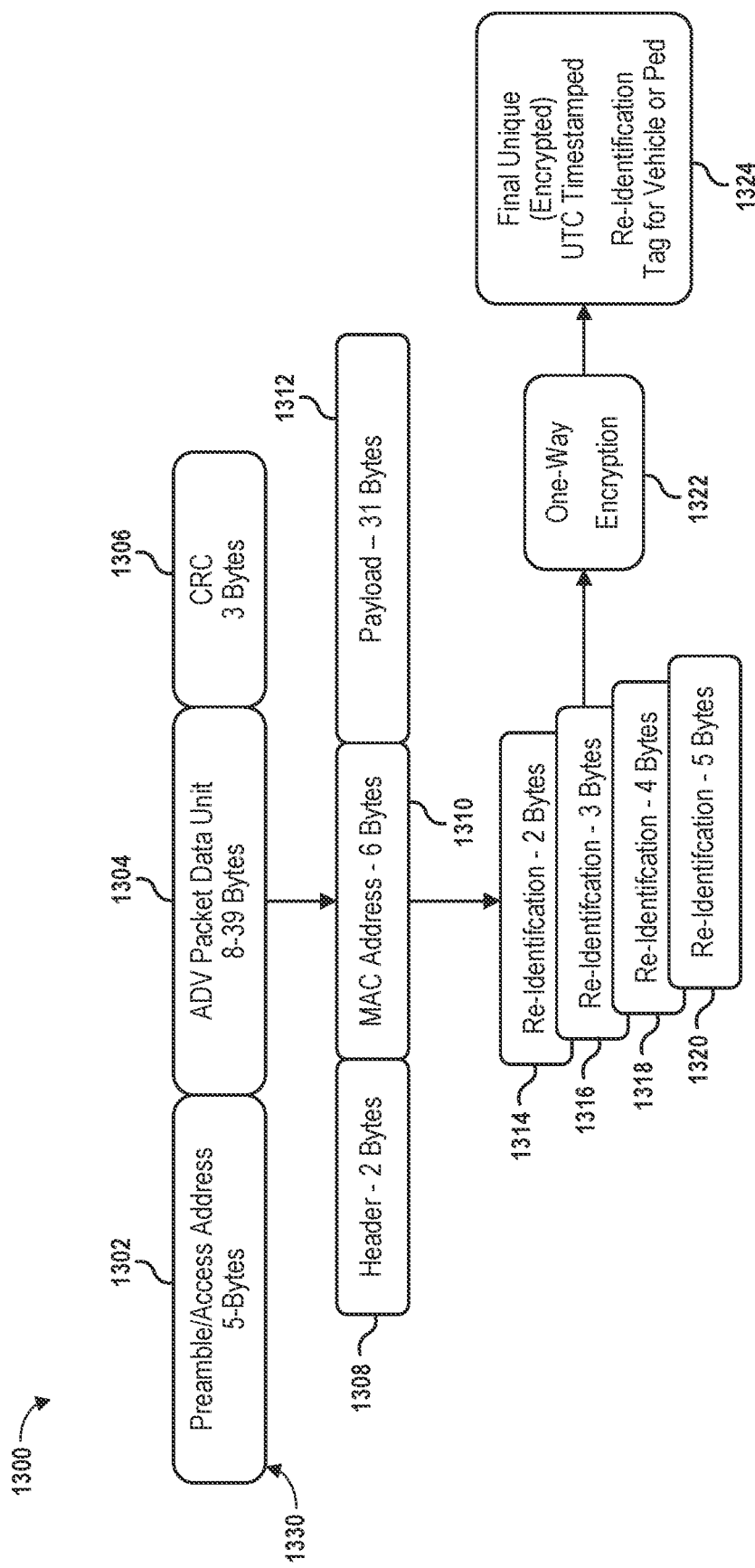
FIG. 13 illustrates an advertising packet and re-identification processes for a data collection unit in accordance with respective examples.

Regardless of the configuration used, BLE advertising packets are detected and extracted from the received signal. A baseband processor may be used for detecting the BLE advertising packet. FIG. 13 illustrates an advertising packet 1330 and re-identification processes 1300 for a data collection unit in accordance with respective examples. The BLE advertising packet 1330 includes a 5 byte preamble/access address 1302; a data unit portion 1304 and a CRC 1306. The BLE advertising detection process may first look for a well-formed preamble 1302. After a preamble 1302 is detected, a MAC address 1310 is extracted from the data unit portion 1304. The data unit portion 1304 may contain a payload 1312 which may be ignored. A header 1308 of the data unit portion 1304 may demodulated to access the MAC address 1310. The header 1308 may be ignored or may be analyzed to determine a valid data unit portion 1304.

To create an identifier associated the device that transmitted the advertising packet 1330, the MAC address may be used. In other examples, a reduced version of the MAC address may be used as a re-identification of the device. For example, two bytes 1314; three bytes 1316; four bytes 1318; or five bytes 1320 of the MAC address 1310 may be used as the re-identification. The selected bytes may be lower bytes of the MAC address 1310. In other examples, the selected bytes may be any combination of bits from the MAC address 1310. In some examples, the MAC address 1310 may use a one-way encryption 1322 to first encrypt the MAC address. The selected bytes may then be taken from the encrypted MAC address.

In some examples, these selected bytes from the encrypted MAC address 1310 may be considered the re-identification for the device. In other examples, the unencrypted selected bytes are encrypted using the one-way encryption 1322. The resulting encrypted value is the re-identification for the device. Using the same process, later received BLE advertising packets from the same device will result in the same re-identification. The re-identification of the device may be combined with a UTC time stamp and encrypted 1324. This data collection by the data collection unit that is transmitted to a remote server may include this encrypted data.

The reduced size re-identification process allows the system to reduce the data backhaul packet size requirements. This reduction results in a lower system power profile and lower data consumption cost.

In various examples, the collected data is sent to a remote server via a data packet. FIG. 14 illustrates a re-identification packet structure 1400 for a data collection unit in accordance with respective examples. The data packet includes a timestamp 1402 that represents or is associated with the received BLE advertising message; a re-identification 1404 of the device; and a RSSI associated with the received BLE advertising message. In various examples, the re-identification 1404 of the device is calculated as described above. The data packet may be stored in non-volatile memory and transmitted to the remote server.

In addition to the collected data, the data collection unit may send heartbeat data to the remote server. The heartbeat handler 414 collected the relevant data and sends the data to the remote server. In examples, the relevant data represents vitals of the data collection unit. The relevant data may be stored in non-volatile memory and transmitted to the remote server.

FIG. 15 illustrates a heartbeat packet structure 1500 for a data collection unit in accordance with respective examples. A timestamp 1502 represents the time associated with the data within the heartbeat packet structure 1500. For example, the timestamp 1502 may indicate when the data was sampled. A firmware version 1504 represents the version of firmware running on the data collection unit. A battery voltage 1506 represents the current battery voltage. The remote server may be used by the remote server to determine health of battery capacity and health of solar/battery charging system. In addition, the remote server may change the data collection unit's configuration based on the battery voltage. For example, if the battery voltage is below a threshold value, the remote server may update the data collection unit's configuration to use a lower power BLE scanning mode.

A temperature 1510 represents a current temperature (C) of data collection unit, and may be used by the remote server to determine the health of system temperature environment. A system uptime counter 1512 starts at 0 and increments indefinitely until the data collection unit goes through a hardware/firmware based reset. The remote server may use this to determine system uptime stability and backhaul connectivity stability. A total number of detected MACs 1514 is a counter that increments indefinitely until system as gone through a hardware/software based reset. Each time a BLE advertising packet MAC address has been detected by the data collection unit the counter is incremented. This value may be used by the remote server to monitor data collection unit BLE detection health and performance. The remote server may use this value to determine when to initiate a data update to update the data collection unit's firmware or configuration.

GPS Latitude 1518 and GPS Longitude 1520 represent the latitude and longitude of the data collection unit from the positioning system of the data collection unit. These values may be used by the remote server to monitor location between sensors and tamper detection in the event the sensor is relocated. GPS Number of Satellites 1522 represents the current number of GPS satellites in view of the data collection unit. This value may be used by the remote server to monitor the viability of the GPS receiver data that is currently being processed by the data collection unit.

The heartbeat data also includes a number of data that describes the cellular channel characteristics that is used to transmit data to the remote server. The remote server may use this cellular data to store cellular data metrics in the event a data collection unit is experiencing poor backhaul communications. A cell earfen data 1526 represents current cellular channel metric that a data collection unit is using for its cellular backhaul communications. A cell RSRP 1528 represents the current Cellular Reference Signal Receive quality metric that a data collection unit is using currently using for its cellular backhaul communications. A Cell RSSI 1530 represents the current cellular Receive Signal Strength Indicator metric that a data collection unit is using currently using for its cellular backhaul communications. A cell tower identifier 1532 represents the current cellular tower identification metric that a data collection unit is using currently using for its cellular backhaul communications. A cell carrier identifier represents the current cellular carrier identification metric that a data collection unit is using currently using for its cellular backhaul communications.

A central server connection error count 1540 may be a counter that increments indefinitely until system goes through a hardware/software based reset every time a failed connection response to the remote sever is detected by the data collection unit. This value may be by the remote server to monitor data collection unit's remote sever connection communications. A central server close error count 1542 may increment indefinitely until system goes through a hardware/software based reset every time a failed connection close response to the remote sever is detected by the data collection unit. This value may be used by the remote server to monitor data collection unit's remote sever connection communications.

An IMU's X-Y-Z orientation monitoring value 1542 that represents the current orientation of the data collection unit reporting X-Y-Z tilt angles. This value may be by the remote server to analyze a desired mounting configuration. An IMU: X-Y-Z tamper detection monitoring value 1544 that represents a tamper detection event of the data collection unit reporting excessive X-Y-Z acceleration events. This value may be used by the remote server to detect a potential tamper detection event.

The heartbeat data may be collected and updated as the data collection unit runs. The data collection unit may periodically send a heartbeat data packet to the remote server. As described above, the remote server may use the heartbeat data in a variety of ways. The heartbeat data, as well as other data collected by the data collection unit, may be sent to the remote server using the data transmission handler 416.

The data transmission handler 416 may use a cellular based radio technology to send backhaul data to the remote server. In one example, the cellular technology uses a narrow band cellular technology that supports three software configurable technologies: LTE Category (M1); Narrow Band IOT; and Traditional 3G UTMS/WCDMA. Both LTE category (M1) and narrow to band IOT support a deep sleep mode also known as a Power Savings Mode (PSM) and extended discontinuous reception (eDRX). The benefits of using these narrow band cellular technologies allows the data collection unit to conserve significant power compared to traditional standard banded cellular technologies such as LTE:CAT3,CAT4,CAT5 which are used in traditional high bandwidth cellular mobile devices. In this example, the data collection unit uses traditional 3G cellular technology in the event a cellular carrier market does not support narrow band cellular technologies in that region.

Figure 16:
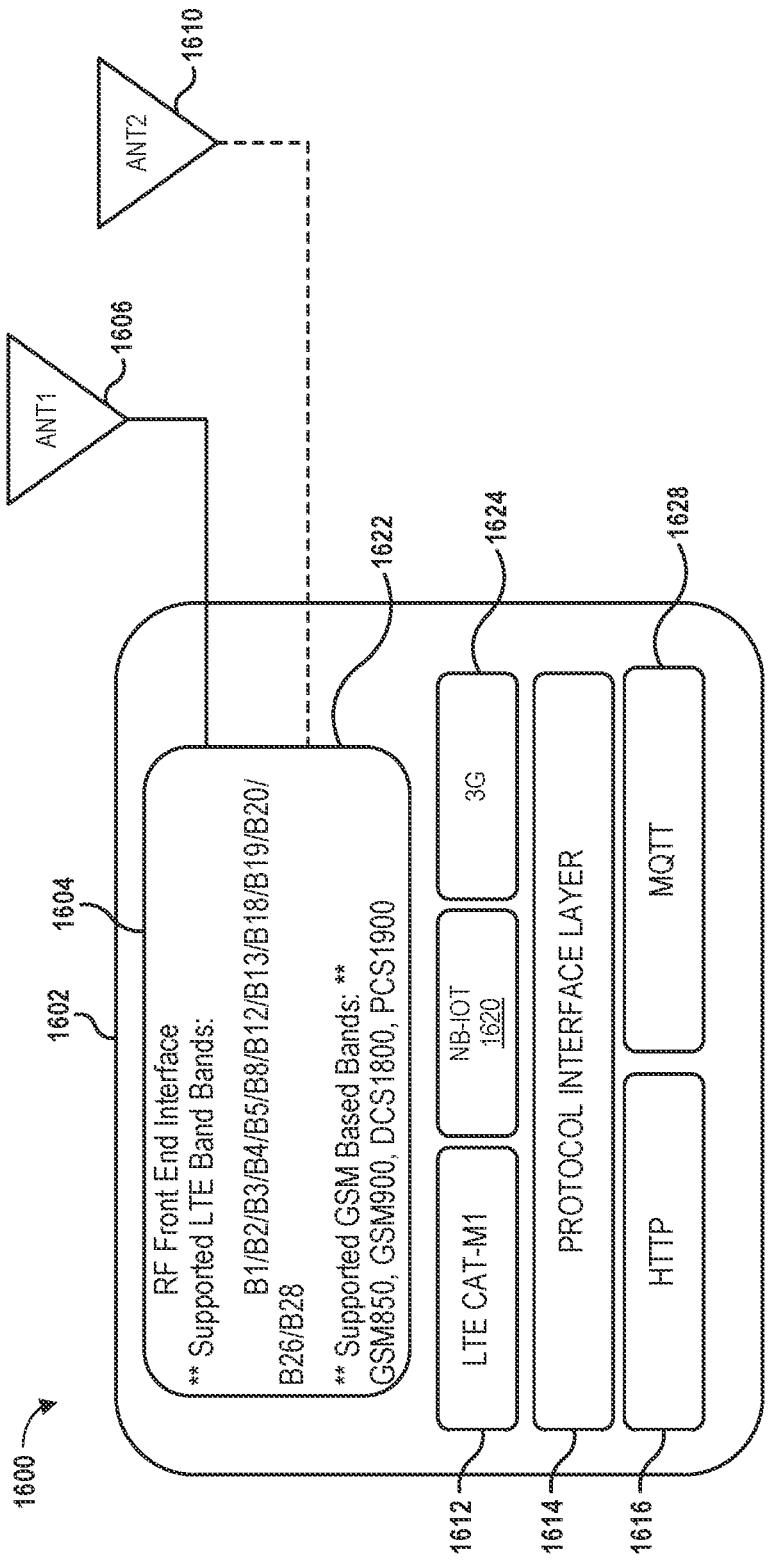
FIG. 16 illustrates a transmission interface for a data collection unit in accordance with respective examples.

FIG. 16 illustrates a transmission interface 1600 for a data collection unit in accordance with respective examples. The transmission interface 1600 includes a multi-technology/banded cellular radio 1602. A front end 1604 provides support for the supported cellular technologies. FIG. 16 illustrates an example of supported cellular technologies. The RF front end 1604 may interface with one, two, or additional antennas. In one example, the cellular antenna interface may be configured using a single antenna interface. In another example, the cellular antenna interface may be configured using a dual antenna interface. Both configurations are shown in FIG. 16. In the single antenna interface, second antenna 1610 is not present. In the dual antenna interface, the antenna 1610 is present.

As described above, in one example the data collection unit provides support for three different cellular technologies: LTE Category (M1) 1612; Narrow Band TOT 1620; and Traditional 3G UTMS/WCDMA 1624. The data collection unit may use these technologies to send the remote server collected data using HTTP 1616 or MQTT 1628. An interface layer 1614 may be used to translate data between the cellular technology currently being used and the protocol interface being used. The data collection unit may implement two firmware configurable protocol interfaces MQTT 1628 and HTTP REST API 1616 based protocol handler. This protocol interface may serve as an Internet Protocol (IP) interface layer to the central processing unit of the data processing unit.

Figure 17:
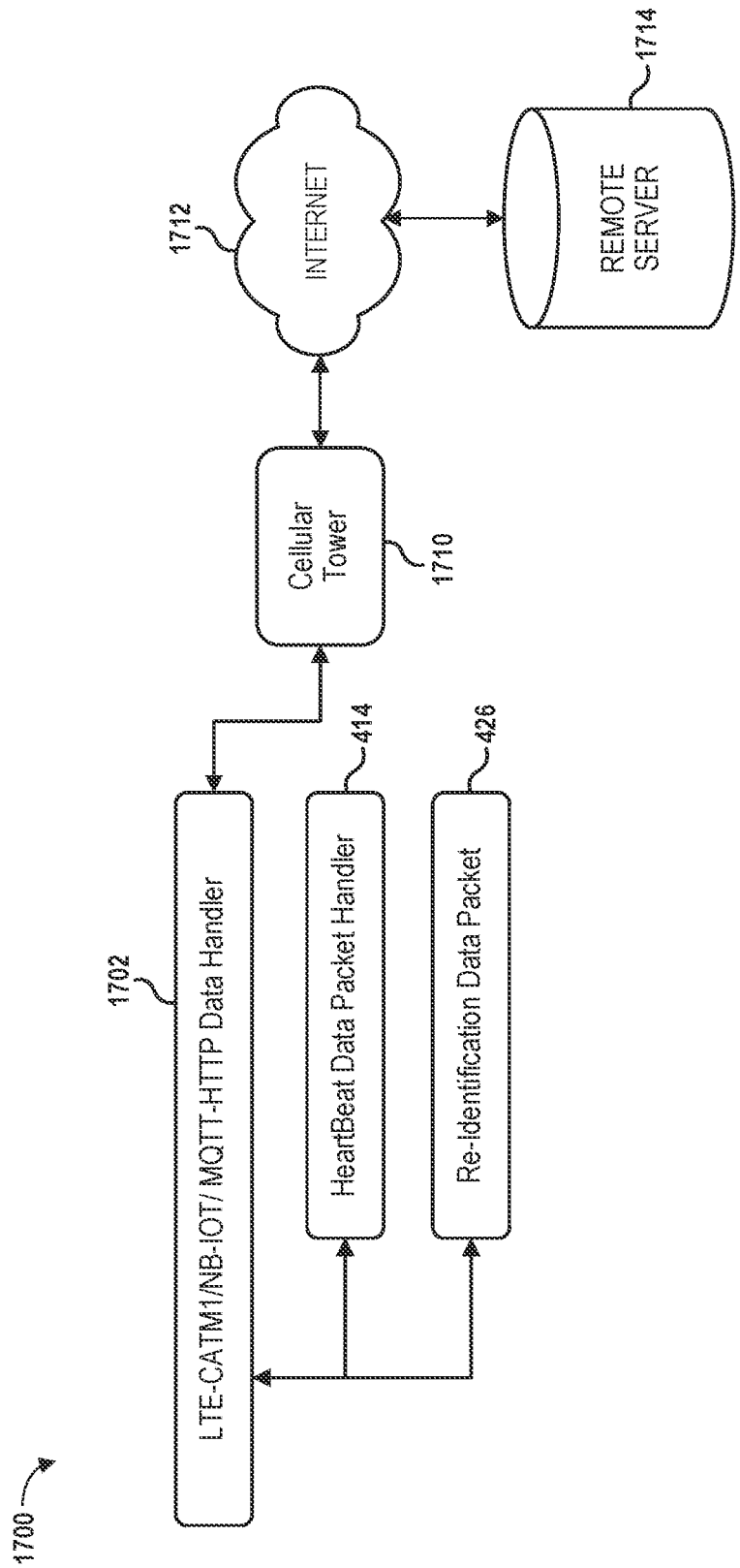
FIG. 17 illustrates a device data flow for a data collection system in accordance with respective examples.

The combination of protocol interface and cellular technology is used for packetizing and sending data to the remote server. FIG. 17 illustrates a device data flow 1700 for a data collection system in accordance with respective examples. Specifically, the illustrated device data flow 1700 illustrates using the LTE CAT-M1 1612 or the NB-IOT 1620 combined with either the HTTP 1616 protocol or the MQTT protocol 1628. A data handler 1702 uses the transmission interface 1600 to send packetized data to the remote server 1714 via a cellular tower 1710. In various examples, the packetized data reaches the remote server 1714 by being routed over the internet 1712. The heartbeat handler 414 and the re-identification data handler 426 are used to gather the data for the sent packets. The packets sent may be in format as shown in FIG. 15 and FIG. 14, respectively. In some examples, the heartbeat data packet is sent out at a configurable fixed rate to the remote server 1714. Re-identification data packets may be sent out at a configurable fixed rate to the remote server 1714. These rates may be changed via the OTA update process described above.

Figure 18:
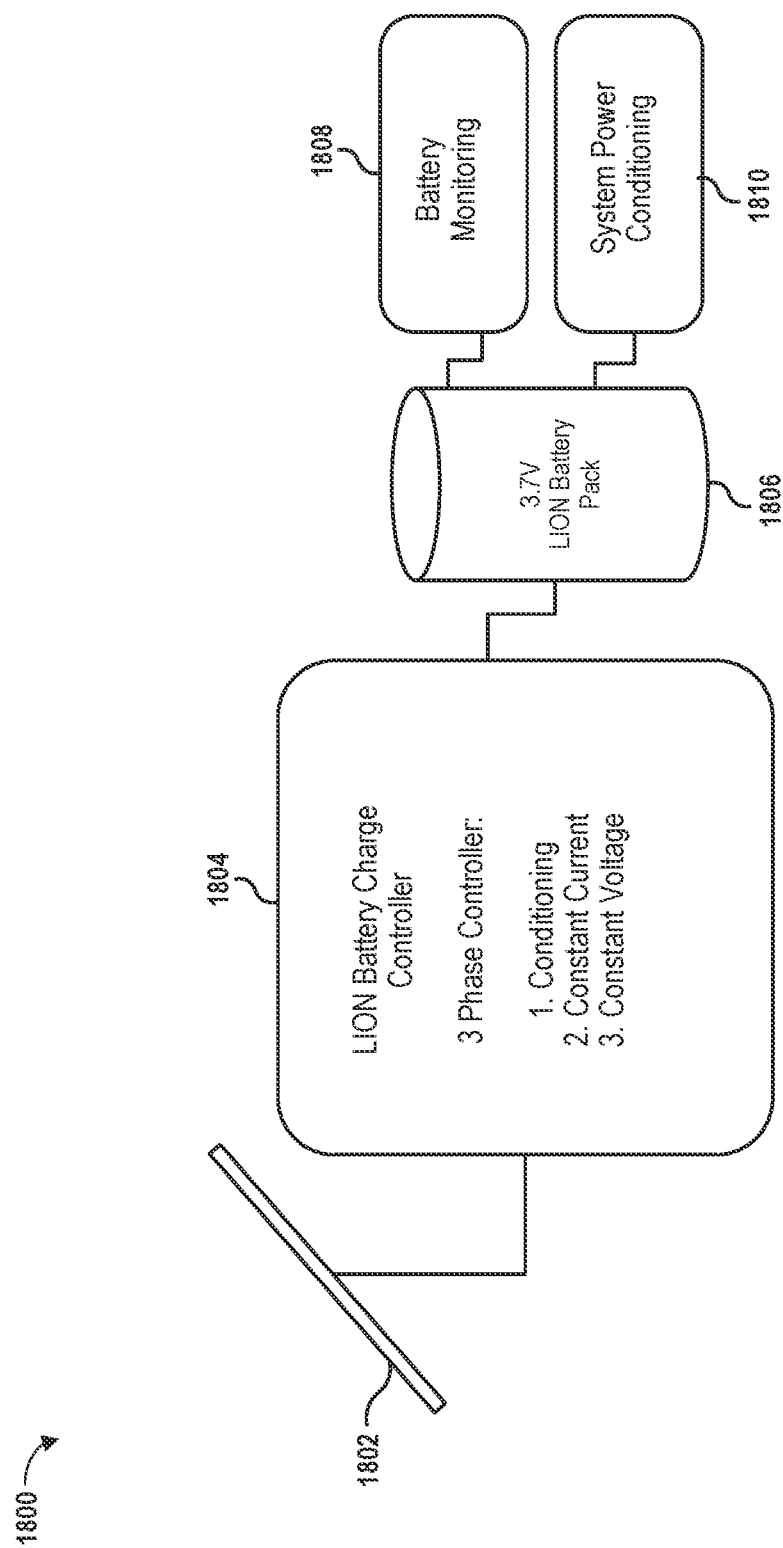
FIG. 18 illustrates a battery charger interface for a data collection unit in accordance with respective examples.

The data collection unit includes a battery that may be charged. The battery is charged using the battery charger control and monitor 418. FIG. 18 illustrates a battery charger interface 1800 for a data collection unit in accordance with respective examples. In an example, a battery charger controller 1804 charges a battery pack 1806 in three phases. In an example, the battery charger controller 1804 charges a battery to 3.7 volts. In a conditioning mode, the battery charger controller 1804 pre-charges a fully discharged battery. The conditioning mode occurs when the battery is fully depleted. In a constant current mode, the battery charger controller 1804 charges the battery in a fast-charge constant current mode using a buck charge mode once the pre-charge mode phase is completed. Once the battery has reached full capacity, a constant voltage mode may be used to charge the battery in a voltage regulation maintenance mode. A system power conditioning component 1810 may be used to condition the power supplied by the battery pack 1806 for use with other components of a data collection unit.

The data collection unit may also contain a battery monitoring subsystem 1808 that collects battery health data. The battery health data may be stored and sent to the remote server to monitor the battery charging system health. The battery health monitor may also place the system into a load disconnect mode in the event the battery capacity has reached a certain low battery voltage threshold to allow battery charging controller to efficiently charge the battery array without a system load attached to the battery.

The IMU system orientation handler 420 monitors the X-Y-Z tilt of the data collection unit using an on-board accelerometer to monitor current system orientation. Proper system orientation may be used to monitor proper solar panel angle orientation, which may be a firmware configurable setting, and detect system tampering. Both system metrics may be reported back to the central processing unit for system health monitoring apart of the heartbeat data packet.

Figure 19:
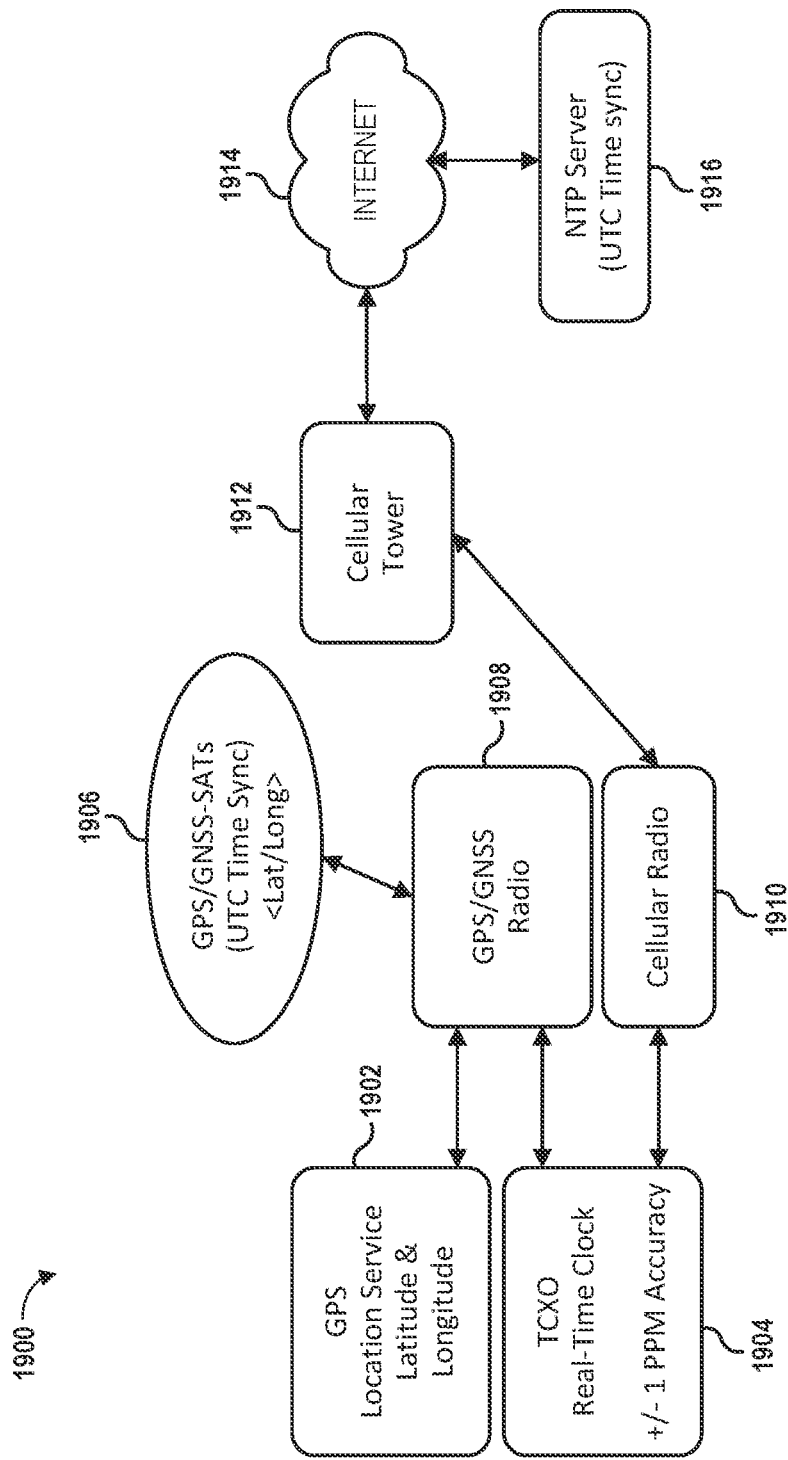
FIG. 19 illustrates a time synchronization process for a data collection unit in accordance with respective examples.

FIG. 19 illustrates a time synchronization process 1900 for a data collection unit in accordance with respective examples. The real time clock (RTC) handler 422 is responsible for creating accurate UTC timestamps for re-identification packets. Accurate UTC timestamps are used by the remote server to synchronize packets from other data collection units that make up a data collection network for vehicular or pedestrian traffic data analysis. In an example, the data collection unit includes a temperature-compensated crystal oscillator (TCXO) real time clock integrated circuit (IC) 1904 which has an accuracy of +/−1 parts per million (PPM) over a temperature range of −40 C to 85 C. An RTC with a +/−1 PPM drift constant is estimated to drift 1 second in twelve days. To prevent the RTC subsystem from drifting the data collection unit may implement one or a combination of mechanisms for RTC clock synchronization.

A first mechanism uses a GPS/GNSS UTC time synchronization 1906 information from a location service 1902, such as a GPS location service. This information is received via a GPS/GNSS radio 1908. Another time synchronization mechanism that may be used is a Network Time Protocol (NTP) time synchronization over a cellular carrier network. In this example, the data collection unit uses the cellular network via its cellular radio 1910 to connect to an NTP server 1916 over the internet 1914. Using the cellular network involves communicating to the NTP server 1916 via a cellular tower 1912 of the cellular network.

In an example, the Network Time Protocol (NTP) may serve as a secondary, failover, mechanism for RTC time synchronization when the GPS/GNSS UTC time protocol serves as a primary mechanism. The GPS/GNSS protocol handler may also acquire the location services metrics: latitude, longitude, number of satellites in view and GPS fix, more than three satellites locked in view, metric data which may be used as QOS (Quality of Service) metrics for the GPS data.

In an example, the data collection unit captures data by determining a scanning algorithm. The scanning algorithm may scan multiple channels simultaneously or in sequence as described above. The selected scanning algorithm may be based on available power of the data collection unit. For example, if there is ample available power, a more high-power scanning algorithm may be chosen. If the available power is below a threshold, a lower power scanning algorithm may be used. The selected scanning algorithm may then be used to scan multiple channels of a spectrum. In an example, the multiple channels are scanned simultaneously with respect to one another. In examples, the spectrum scanned is in the BLE spectrum and the channels scanned are BLE advertising channels. In an example, a first advertising packet is detected on a first channel and a second advertising packet is detected on a second, different, channel. Receiving the first advertising packet and the second advertising packet may overlap in at least a portion of time. MAC addresses are extracted from both advertising packets. Each MAC address identifies a device. In addition, a received signal strength indicator for both advertising messages is determined and saved. The MAC addresses are reduced in size by removing some data from each MAC address. For example, one or more bytes may be removed from each MAC address. An identifier for each device is created using the reduced size MAC address. For example, a one-way hash or a one-way encryption processes may use the AMC address as input, and whose result is the identifier. The identifier, the corresponding RSSI, and a timestamp is packetized and sent to a remote system. The remote system may use this data along with data from different data collection units regarding the same device, to determine traffic information of the device. For example, the speed, route, location, travel time, etc., may be calculated by the remote system.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The systems and methods of the present invention may be implemented in many different computing environments. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. Still further, the present invention may be implemented in cloud-based data processing environments, where one or more types of servers are used to process large amounts of data, and using processing components such as CPUs, GPUs, TPUs, and other similar hardware. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of collecting real-time traffic data, the method comprising:
   determining, by a data collection node, a scanning algorithm;
   scanning, by the data collection node, multiple channels of a spectrum simultaneously using the scanning algorithm;
   detecting a first advertising packet from a first channel of the multiple channels;
   detecting a second advertising packet from a second channel of the multiple channels, wherein the second advertising packet and the first advertising packet overlap in reception at the data collection node;
   determining, from the first advertising packet, a first media access control (MAC) of a first device that sent the first advertising packet;
   determining a first received signal strength indicator (RSSI) for the first advertising packet;
   determining, from the second advertising packet, a second MAC of a second device that sent the second advertising packet;
   determining a second RSSI for the second advertising packet;
   removing at least one byte from first MAC address to create a first reduced MAC address;
   removing at least one byte from second MAC address to create a second reduced MAC address;
   determining a first identifier of the first device based on the first reduced MAC address;
   determining a second identifier of the second device based on the second reduced MAC address;
   sending the first identifier, the first RSSI, and a first timestamp to a remote system; and sending the second identifier, the second RSSI, and a second timestamp to the remote system.

2. The method of claim 1, wherein the determining the scanning algorithm is based on available power to the data collection node.

3. The method of claim 1, wherein the multiple channels comprise three advertising channels.

4. The method of claim 3, wherein the spectrum is Bluetooth low energy spectrum.

5. The method of claim 4, wherein the first channel is centered at 4,202 megahertz.

6. The method of claim 1, further comprising:
entering a deep sleep mode after the sending the first identifier and the sending of the second identifier;
exiting the deep sleep mode; and
scanning the multiple channels of the spectrum simultaneously using the scanning algorithm.

7. The method of claim 1, wherein the determining a first identifier of the first device based on the first reduced MAC address comprises encrypting the first reduced MAC address.

8. The method of claim 1, wherein the scanning the multiple channels of the spectrum simultaneously comprises scanning the entire spectrum using a wide band receiver.

9. The method of claim 1, wherein the scanning the multiple channels of the spectrum simultaneously comprises scanning each of the multiple channels using a separate receiver.

10. A system for collecting real-time traffic data, the system comprising:
an electronic processor of a data collection unit configured to:
determine a scanning algorithm;
a radio frequency front end of the data collection unit configured to:
scan multiple channels of a spectrum simultaneously using the scanning algorithm;
the electronic processor further configured to:
detect a first advertising packet from a first channel of the multiple channels;
detect a second advertising packet from a second channel of the multiple channels, wherein the second advertising packet and the first advertising packet overlap in reception at the data collection node;
determine, from the first advertising packet, a first media access control (MAC) of a first device that sent the first advertising packet;
determine a first received signal strength indicator (RSSI) for the first advertising packet;
determine, from the second advertising packet, a second MAC of a second device that sent the second advertising packet;
determine a second RSSI for the second advertising packet;
remove at least one byte from first MAC address to create a first reduced MAC address;
remove at least one byte from second MAC address to create a second reduced MAC address;
determine a first identifier of the first device based on the first reduced MAC address;
determine a second identifier of the second device based on the second reduced MAC address;
send the first identifier, the first RSSI, and a first timestamp to a remote system; and
send the second identifier, the second RSSI, and a second timestamp to the remote system.

11. The system of claim 10, further comprising:
the remote system configured to:
determine a location of the first device based on the received first identifier, the first RSSI and the first timestamp from the data collection unit and from additional data from other data collection units, wherein the additional data comprises the first identifier.

12. The system of claim 10, wherein to determine the scanning algorithm is based on available power to the data collection node.

13. The system of claim 10, wherein the multiple channels comprise three advertising channels.

14. The system of claim 1, wherein the electronic processor is further configured to:
enter a deep sleep mode after the sending the first identifier and the sending of the second identifier;
exit the deep sleep mode; and
scan the multiple channels of the spectrum simultaneously using the scanning algorithm.

15. The system of claim 10, wherein to determine a first identifier of the first device based on the first reduced MAC address the electronic processor is further configured to encrypt the first reduced MAC address.

16. The system of claim 10, wherein to scan the multiple channels of the spectrum simultaneously the radio frequency front end is configured to scan the entire spectrum using a wide band receiver.

17. The system of claim 10, wherein to scan the multiple channels of the spectrum simultaneously the radio frequency front end is configured to scan each of the multiple channels using a separate receiver.

18. A non-transitory computer-readable storage medium storing computer-executable instructions that when executed by a processor of a data collection node cause the processor to perform operations comprising:
determining a scanning algorithm;
controlling scanning multiple channels of a spectrum simultaneously using the scanning algorithm;
detecting a first advertising packet from a first channel of the multiple channels;
detecting a second advertising packet from a second channel of the multiple channels, wherein the second advertising packet and the first advertising packet overlap in reception at the data collection node;
determining, from the first advertising packet, a first media access control (MAC) of a first device that sent the first advertising packet;
determining a first received signal strength indicator (RSSI) for the first advertising packet;
determining, from the second advertising packet, a second MAC of a second device that sent the second advertising packet;
determining a second RSSI for the second advertising packet;
removing at least one byte from first MAC address to create a first reduced MAC address;
removing at least one byte from second MAC address to create a second reduced MAC address;
determining a first identifier of the first device based on the first reduced MAC address;
determining a second identifier of the second device based on the second reduced MAC address;
sending the first identifier, the first RSSI, and a first timestamp to a remote system; and
sending the second identifier, the second RSSI, and a second timestamp to the remote system.

19. The non-transitory computer-readable storage medium of claim 18, wherein the determining the scanning algorithm is based on available power to the data collection node.

20. The non-transitory computer-readable storage medium of claim 19, wherein the determining a first identifier of the first device based on the first reduced MAC address comprises encrypting the first reduced MAC address.

* * * * *